US006584998B1

(12) United States Patent
Milner

(10) Patent No.: US 6,584,998 B1
(45) Date of Patent: Jul. 1, 2003

(54) APPARATUS AND METHOD FOR REGULATING GAS FLOW

(75) Inventor: David V. Milner, Long Valley, NJ (US)

(73) Assignee: Innovative Engineered Solutions, LLC, Long Valley, NJ (US)

(*) Notice: Subject to any disclaimer, the term of this patent is extended or adjusted under 35 U.S.C. 154(b) by 0 days.

(21) Appl. No.: 09/541,154

(22) Filed: Mar. 31, 2000

(51) Int. Cl.[7] .............................. F17C 9/04; F17C 5/02; F16K 31/365

(52) U.S. Cl. ......................... 137/486; 62/50.4; 62/50.7; 141/82

(58) Field of Search ............................ 137/2, 485, 486, 137/487.5, 14; 62/50.2, 50.4, 50.7; 141/4, 11, 69, 82, 197; 123/523, 525

(56) References Cited

U.S. PATENT DOCUMENTS 2,377,342 A 6/1945 Holicer
2,895,502 A * 7/1959 Roper et al. ................ 137/486
2,938,536 A * 5/1960 Ehrenberg .................. 137/486
2,951,348 A * 9/1960 Loveday et al. ............. 62/50.2
3,183,678 A * 5/1965 Hosford ...................... 62/50.4
3,273,349 A * 9/1966 Litvin et al. ................. 62/50.2
3,362,177 A * 1/1968 Case .......................... 62/50.4
3,690,115 A * 9/1972 Clayton ................... 137/487.5
3,788,039 A 1/1974 Bragg ......................... 55/160
3,986,846 A 10/1976 Bivins, Jr.
4,237,700 A 12/1980 Rothchild ................. 62/514 R
4,276,749 A * 7/1981 Crowley ..................... 62/50.2
4,431,020 A * 2/1984 Kowalski ................. 137/487.5
4,627,243 A 12/1986 Schaub .......................... 62/52
5,231,838 A * 8/1993 Cieslukowski .............. 62/50.4
5,325,894 A * 7/1994 Kooy et al. .................. 62/50.4
5,373,702 A * 12/1994 Kalet et al. .................. 62/50.2
5,381,667 A 1/1995 Worley et al. ............... 62/50.2
5,571,231 A * 11/1996 Lee ............................ 62/50.4
5,586,574 A * 12/1996 Smith ...................... 137/487.5
5,590,535 A * 1/1997 Rhoades ..................... 62/50.2
5,660,198 A * 8/1997 McClaran ................ 137/487.5
5,687,776 A * 11/1997 Forgash et al. ............. 62/50.4
5,698,037 A 12/1997 Stauffer
5,762,119 A * 6/1998 Platz et al. ................... 141/82
5,771,946 A * 6/1998 Kooy et al. .................... 141/82
RE36,808 E * 8/2000 Caldwell .................... 62/50.4
6,119,480 A * 9/2000 Germain et al. ............. 62/50.2
6,125,637 A * 10/2000 Bingham et al. ............ 62/50.2
6,446,445 B1 * 9/2002 Phillips et al. ............... 62/50.2

FOREIGN PATENT DOCUMENTS

DE 3731356 A1 3/1989

* cited by examiner

*Primary Examiner*—George L. Walton
(74) *Attorney, Agent, or Firm*—Senniger, Bowers & Leavitt & Roedel

(57) ABSTRACT

An apparatus and method provide automatic regulation of flow of fluid from a source where it is stored as liquified gas. The apparatus includes a flow control valve connected in a conduit connecting the source in flow communication to a vaporizer. The apparatus also includes a valve controller operable to regulate the flow of fluid in liquid phase at least partially through the valve. The controller derives the energy to operate the valve and the controller from the fluid when the fluid is in its gas phase. The vaporizer can be used to warm the fluid passing therethrough.

5 Claims, 4 Drawing Sheets

APPARATUS AND METHOD FOR REGULATING GAS FLOW

BACKGROUND OF THE INVENTION

This invention relates to the flow rate regulation of process streams for fluid that is stored in liquid phase and converted to gas phase for use. Regulation is by flow control apparatus situated in the liquid phase that is controlled by a controller sensing conditions of fluid flow in the gas phase. The controller derives the energy from the fluid for its operation and operation of a flow control valve.

It is common practice in industry to store many fluids (which are in gas phase at atmospheric conditions) in liquified form. Such fluids include liquified hydrocarbons like propane, butane and cryogenic gases like argon, oxygen, carbon dioxide, nitrogen, helium and hydrogen. Many liquified gases are maintained at cold temperatures to reduce the need for high storage pressures, such gases being referred to as cryogenic gases. Many liquified gases can be maintained and stored at reasonable pressures not requiring highly reduced temperatures, one such gas being propane. Prior to use of the fluid, the liquified gas is heated and/or has its pressure reduced to convert it from its liquid phase to its gas phase. Such conversion to vapor is accomplished by heating and/or expansion which is typically carried out in a vaporizer or conduit downstream of a valve or can be carried out in an expansion valve alone, or in both. The flow rate of fluid, both in its liquid phase and its gas phase, can be regulated for appropriate flow thru the vaporizer so it is not operated at an over capacity condition and at the point or points of fluid use downstream of the storage tank.

Some such gas supply systems are present for the principal purpose of backup to a primary gas supply system. Such dual systems are commonly found in industries where the gas could be used as a chemical feedstock to a production process (e.g. paper making, petrochemical and chemical refining, mineral extraction, water treatment, etc.) or used as a combustion agent (e.g. steel making, glass making, cement manufacture, non-ferrous metal smelting, etc.) or to control the composition of an atmosphere in a process (e.g. food, glass, metals, electronics, hospitals (for patient use amongst other uses), etc.). Often the continuous supply of gas is critical to life or safety of the process or the prevention of large economic loss-regardless of the presence of energy to operate a control system.

Several forms of flow rate regulating apparatus are used to control fluid flow rate. One device is illustrated in FIG. 1 which utilizes a flow control valve V1 and controller C1 therefor connected in the outfeed conduit OC1 of the vaporizer VP1. The controller receives signals from a temperature sensor TS1 and pressure sensor PS1. The valve and the sensors are situated in the gas phase. Liquified gas is supplied to the vaporizer VP1 from storage tank ST1 via an infeed conduit IC1. One problem with such an arrangement is surging, particularly at lower operating pressures. Another problem with such a system is that the valving required to handle fluid flow when the fluid is in the gas phase are much larger and more expensive than valves used for an equivalent mass flow rate when the fluid is in liquid phase. Such a valve and controller components are available from Kaye & MacDonald a division of Cashco of Elsworth, Kans.

Another such prior art device is illustrated in FIG. 2 where the flow control valve V2 and controller C2 are both positioned in the infeed conduit IC2 connecting the liquified gas storage tank ST2 to a main vaporizer VP2. The main vaporizer is used to provide pressurized fluid in gas phase back to the storage tank thru a conduit CN2 to keep the tank pressurized. The valve is operable to regulate the flow rate of liquified gas therethrough and hence the pressure of the gas phase returning to the tank. A secondary vaporizer VP2' is connected to the conduit IC2 and the valve to provide a pressure signal to the valve to effect its pressure regulating function. Liquified gas is discharged from the tank for use via an outfeed conduit OC2. Such a system is used solely to control storage tank pressure.

Another arrangement used in the prior art is illustrated in FIG. 3. A storage tank ST3 is connected to a vaporizer VP3 via an infeed conduit IC3. A flow control valve V3 is connected in the infeed conduit IC3 and is controlled by an electronic controller EC3 programmed with operating instructions. The electronic controller receives information from the outfeed conduit OC3 of the vaporizer VP3 sensing properties of the gaseous phase of the fluid with a temperature sensor TS3 and a pressure sensor PS3. Such a system is complex and expensive. Further, its operation requires energy from a remote source which is subject to interruption. Without electrical energy, such a control system may malfunction creating potentially catastrophic results downstream. To overcome such potentialities, backup power systems are provided, such backup systems can include uninterruptable power supplies (UPS), back up generators or both. Such backup energy systems can be quite expensive. A pneumatic control system may also be provided to avoid reliance on power supplies but in the past these have all required an external source of instrument gas to operate the control apparatus.

Thus, there is a need for an improved regulated flow control apparatus for use with fluid systems wherein the fluid is stored as a liquified gas and is used as a vapor.

SUMMARY OF THE INVENTION

Among the several objects and features of the present invention may be noted the provision of an apparatus that will regulate the flow rate of fluid from a source of liquified gas to a point of use where the fluid is in vapor phase; the provision of such an apparatus that does not require an external energy source to control the operation of a flow control valve; the provision of such an apparatus where the flow control valve regulates the flow of the liquified gas therethrough; the provision of such an apparatus that monitors conditions of the vapor phase of the fluid downstream to provide information for regulating the flow of the liquid phase; the provision of a method regulating the flow of fluid from a source where it is stored in liquid phase to a point of use where the fluid is used in gas phase; the provision of a method of regulating flow of fluid whereby the fluid flow is regulated at a point where the fluid is in liquid form and the regulation is effected in response to properties of the fluid when in its gas phase downstream of the point of flow regulation; and the provision of an apparatus and method that are economical to implement and effective at flow regulation.

The present invention involves the provision of a system for delivering fluid from a source of liquified gas. The system includes a source storing fluid as liquified gas. A conduit is connected in flow communication with the source and is operable for discharge of fluid from the source. A flow control valve is connected in the conduit flow-wise downstream of the source and separates the conduit into an infeed conduit portion and an outfeed conduit portion with the outfeed conduit portion being flow-wise downstream of the infeed conduit portion. The flow control valve is operable to receive fluid in liquid phase and regulate the flow of fluid in liquid phase from the source to the outlet conduit portion. A controller is operably connected to the flow control valve and operable to control the flow of fluid in liquid phase from the source at least partially thru the flow control valve and to the outfeed conduit portion in response to flow of fluid in its gas phase in the outfeed conduit portion. The controller is substantially completely powered with energy from the fluid in its gas phase.

The present invention further involves the provision of a method of transporting fluid from a source storing the fluid as a liquified gas to at least one point of use where the fluid is in its gas phase. The method includes transporting fluid from a source of fluid in the form of liquified gas to a flow control valve. The flow rate of liquified gas from the source is regulated with the flow control valve, the liquified gas flowing at least partially thru the valve. The fluid is converted from liquified gas to a gas phase downstream of at least a portion of the flow control valve. At least one property of the gas phase is monitored and the flow rate of liquified gas is regulated in response to at least one property of the gas phase. At least a substantial portion of the energy needed to regulate the flow rate of liquified gas from the source is derived from the gas phase of the fluid.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
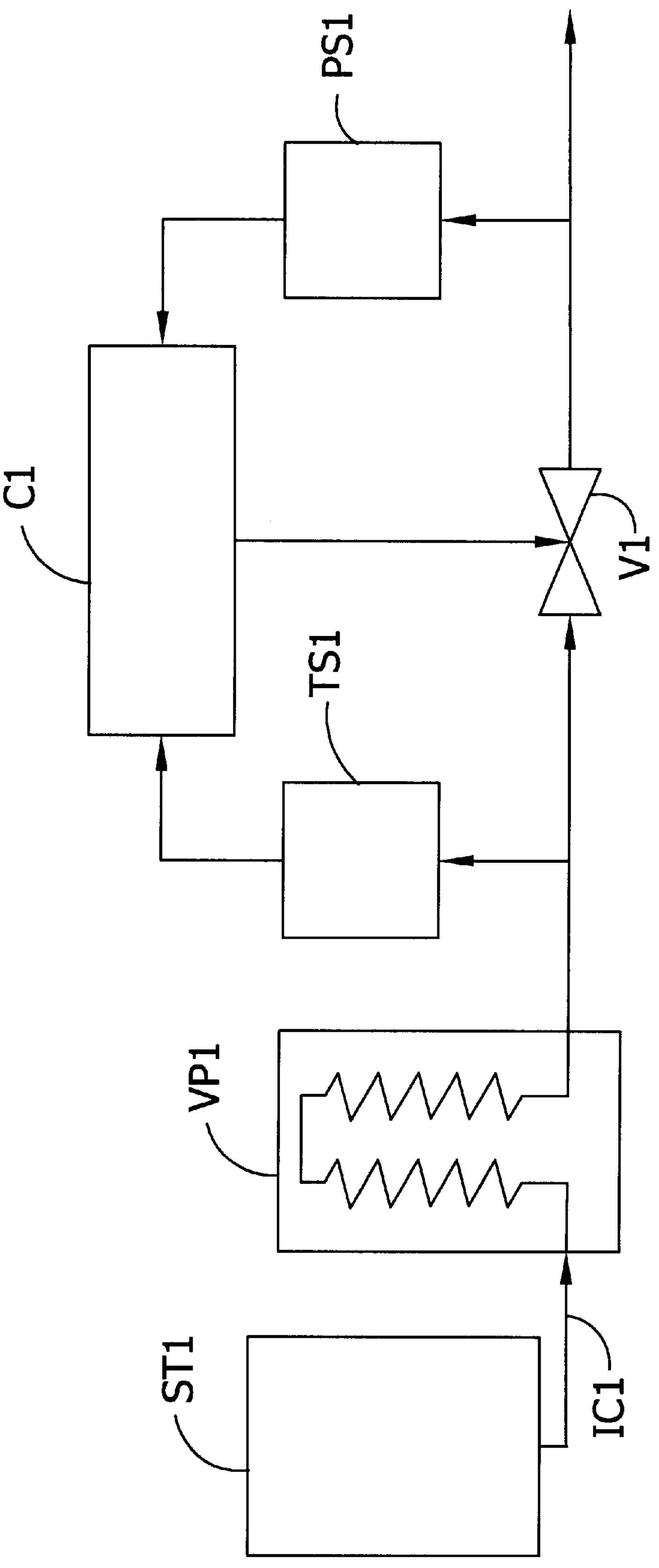
FIG. 1 is a schematic illustration of one prior art device used to regulate flow of fluid in an apparatus wherein the fluid changes from a liquid phase to a gas phase.
Figure 2:
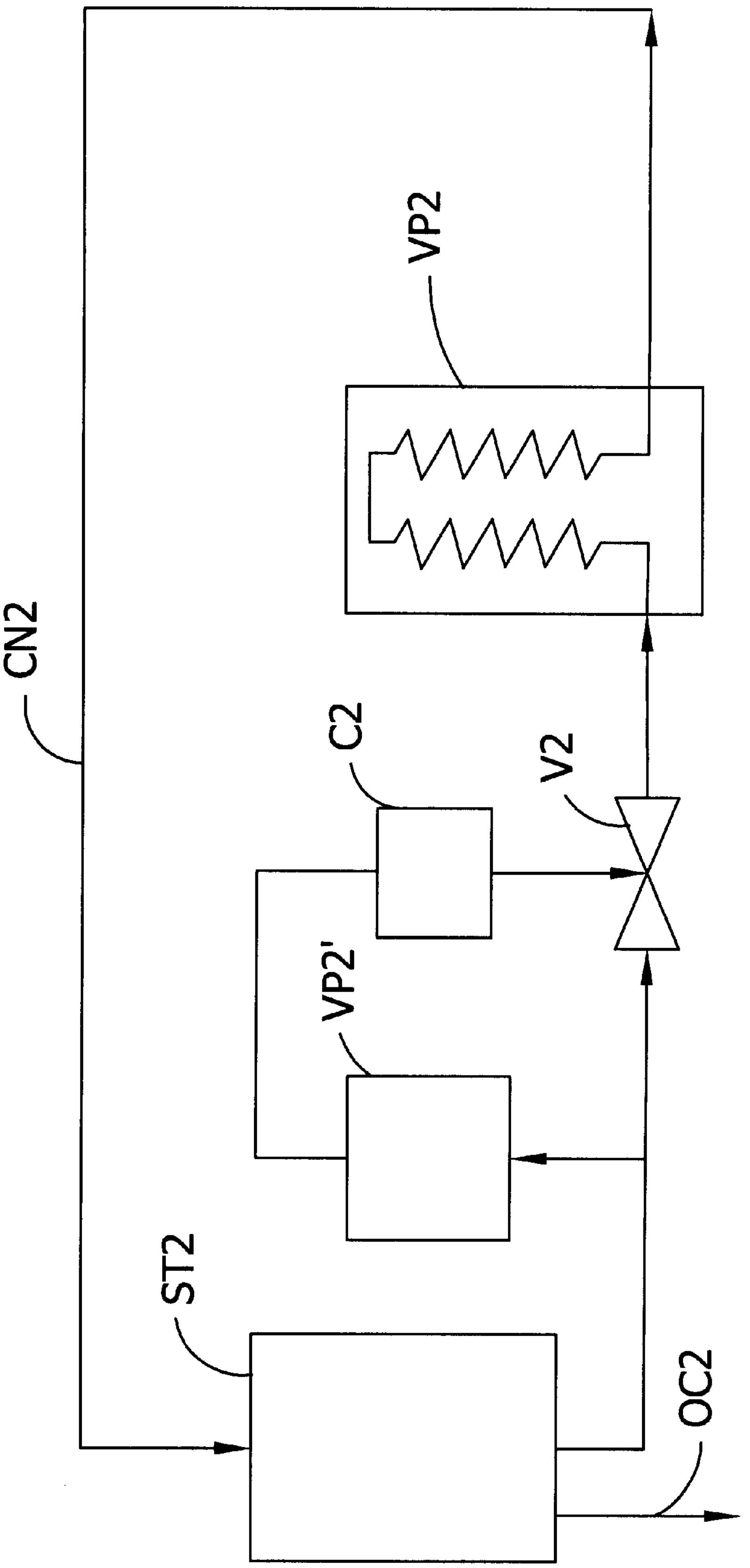
FIG. 2 is a schematic illustration of another prior art device used to regulate such fluid flow.
Figure 3:
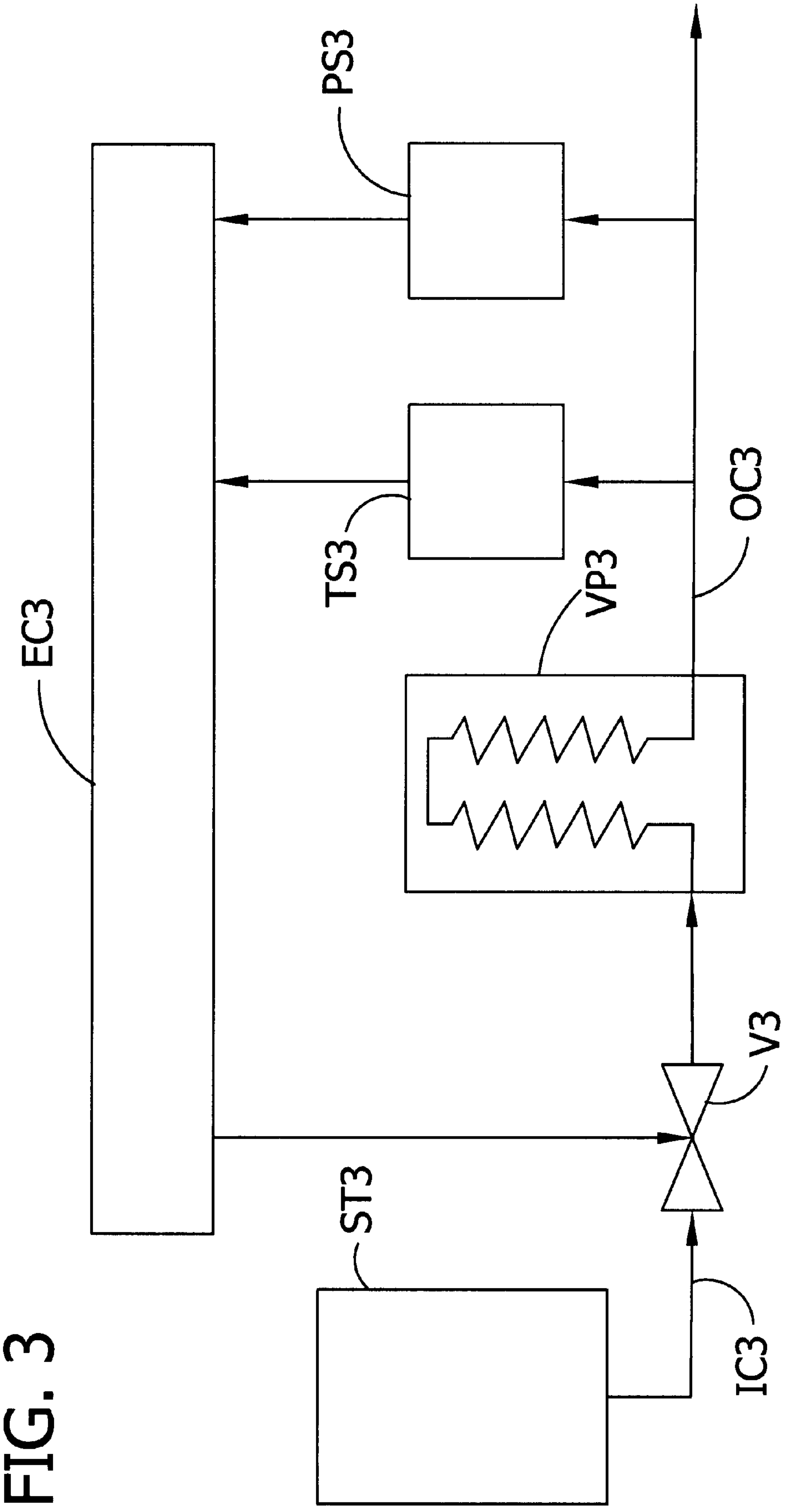
FIG. 3 is a schematic illustration of still another prior art device used to regulate such fluid flow.
Figure 4:
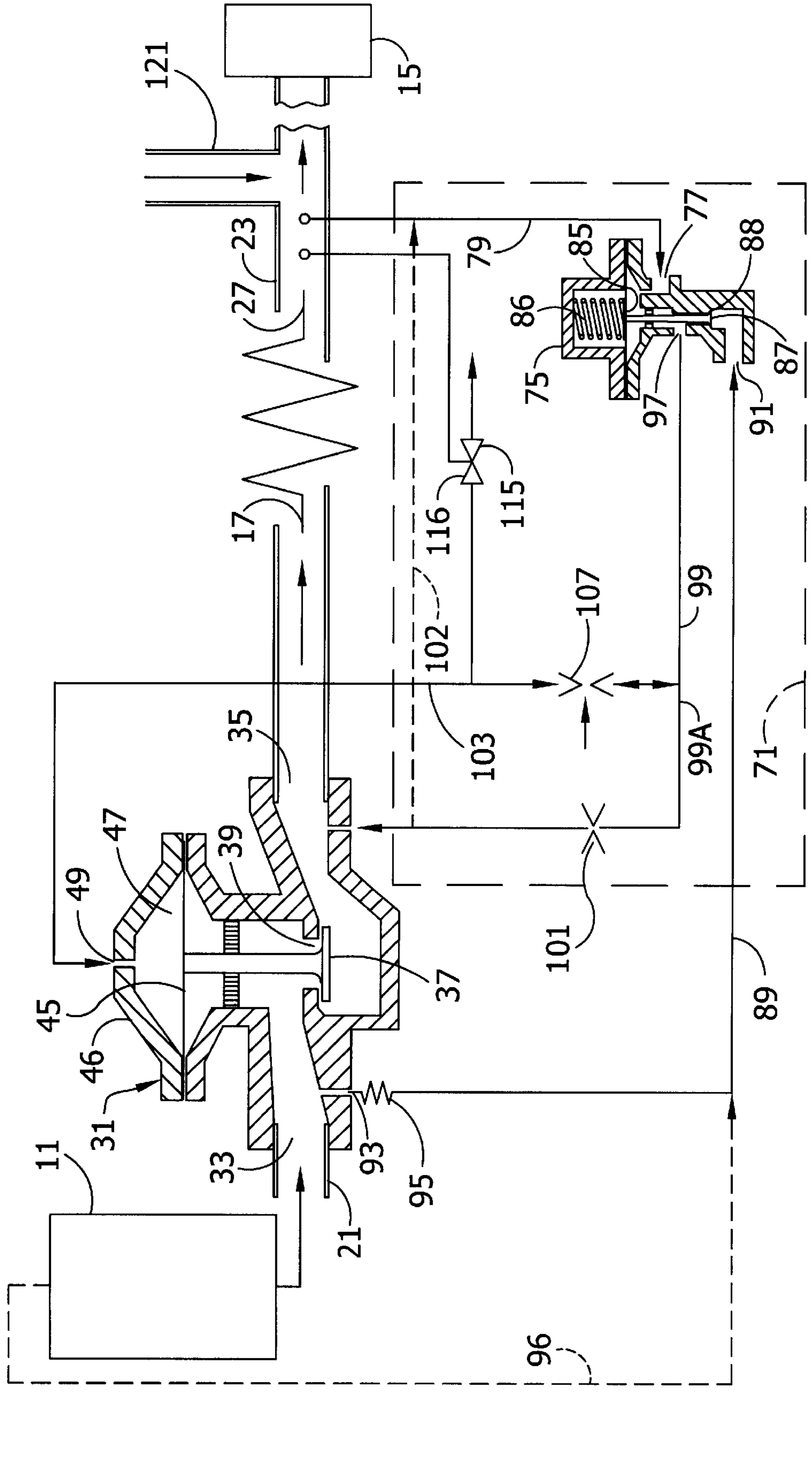
FIG. 4 is a schematic illustration of a preferred embodiment of the inventive device for regulating fluid flow from a source of liquified gas.

FIG. 4 illustrates the apparatus for regulating the flow of fluid from a source 11 where the fluid is stored in liquid phase as a liquified gas. Such fluids include hydrocarbons such as propane, butane, natural gas, etc., cryogenic gases such as argon, oxygen, nitrogen, helium, hydrogen, carbon dioxide, etc. and has particular application to cryogenic gas handling systems. The source 11 is connected in flow communication with downstream equipment designated generally as 15 which equipment can take many forms, such as process equipment in plants and labs, gas dispensing systems, e.g., hospital gas systems, etc. In the case of cryogenic gases, the source 11 is connected in flow communication with an inlet 17 of a vaporizer 19 via a conduit 21 which will be referred to as an infeed conduit (relative to the vaporizer). A vaporizer is basically a heat exchanger to provide heat input to the fluid flowing therethrough to assist in the conversion of the fluid from liquid phase to gas phase. A conduit 23 is connected in flow communication with an outlet 27 of the vaporizer 19 and connects the vaporizer to the downstream equipment. The conduit 23 is an outfeed conveyor (relative to the vaporizer). The vaporizer 19 is operable to help effect expansion of the liquified gas from the source 11 and thereby change to a gas phase. Such vaporizers are well known in the art. If the fluid is not cryogenic or having the fluid converted quickly to gas phase is not important, the use of a separate vaporizer may be dispensed with. Expansion and heating of the fluid can be accomplished in the conduit.

A flow control valve 31 is connected in flow communication in the conduit 21 flow-wise between the vaporizer 19 and the source 11 whereby fluid flowing from the source 11 to the vaporizer 19 flows thru the valve. A preferred valve is a pilot operated valve such as the Do-All series valve from Kaye & MacDonald. Such valves are well know for fluid flow rate regulation. Such valves can be used to both regulate flow and effect some expansion of the liquified gas to permit the phase change of the fluid from liquid phase to gas phase. The valve 31 includes an inlet 33 and an outlet 35 both connected to the infeed conduit 21. Valve element 37 is mounted in the valve and selectively varies the size of the flow orifice 39 to vary the amount of fluid that can flow therethrough. The valve element 37 is biased to a degree of open by a diaphragm 45. Preferably, the valve is a proportional control valve that can also close completely if the pressure on the downstream side is above a predetermined minimum pressure. Alternately, the valve 37 may also be a spring biased diaphragm operated valve. The bias of the spring in such a valve may be variable as is known. The valve 31 is pilot regulated. The diaphragm 45 and cover 46 form a chamber 47. An inlet 49 provides a flow path to the chamber 47 for receiving pressurized pilot fluid that will assist in varying the position of the valve element 37 and hence the degree the valve 31 is open or closed. As shown, an increase in pressure in the chamber 47 will open the valve more and a decrease in pressure will close the valve more thus allowing for regulation of the flow rate of fluid through the valve 31.

The valve 31 is controlled by an analog controller designated generally as 71. The controller is of a type that can derive the energy it needs for flow rate regulation of the valve 31 and itself from the fluid, not needing any additional source of energy, e.g., electricity or an instrument gas to operate. This allows regulated flow to continue without the need for an energy source outside of the energy contained in the pressurized fluid. Substantially all and preferably all the energy needed to operate the valve 31 and the controller 71 is derived from the fluid. This is accomplished by utilizing pressure differentials within the system.

As seen in FIG. 4, the controller includes a pilot valve assembly 75 with a pressure port 77 connected in flow communication to the conduit 23 by a conduit 79 such that the spring biased diaphragm 85 is exposed to the pressure in conduit 23 at a point downstream of the vaporizer where the fluid is in it gas phase and is operable to function as a fluid pressure sensor for the controller 71. Such a pilot valve is available as Model 135 also available from Kaye & MacDonald. A valve element 87, which in combination with the valve seat 88 forms a valve, is movable by the diaphragm 85, which functions as the pressure sensor, as well as the spring 86, between open and closed positions. The valve assembly 75 functions as a narrow band proportional controller to introduce more or less gas from the high pressure conduit 89 into the intermediate pressure conduit 99 in response to a changing pressure at pressure port 77. A high pressure conduit 89 is connected in flow communication with a port 91 of the valve assembly 75 and is also connected to a source of high pressure fluid such as gas. As illustrated, the conduit 89 is connected to a port 93 on the upstream side of the valve 31 and includes a vaporizer 95 to convert the liquified gas to its gas phase for flow to and thru the valve assembly 75 as described below. Alternately, the high pressure gas could be provided by a direct connection (shown by the dashed line 96) to the source 11. If the valve element 87 is open, gas from the conduit 89 can flow thru the valve assembly 75 and out an outlet port 97 to a conduit 99 connected to the port 97. The pressure in the conduit 99 is lower than the pressure of the gas in the conduit 89 for flow of gas from the conduit 89 to the conduit 99. The pressure in the conduit 99 will be referred to as intermediate pressure (lower relative to the high pressure in conduit 89).

The conduit 99 connects the port 97 to the conduit 23 preferably on the downstream side of the valve 31 and upstream of the vaporizer 19. A restriction orifice 101 is situated in the conduit 99 and provides a variable back-pressure in the conduit 99 between the restriction orifice and the valve port 97 allowing fluid in the conduit 99 to flow out therefrom to the conduit 23. Alternately, the conduit 99 could be connected in flow communication to the conduit 79 (shown by the dashed line 102) to allow fluid in the conduit 99 to flow out. The pressure in this section 99A of the conduit 99 is less than the pressure in the conduit 89 and higher than the pressure at the port 77 when there is flow therethrough. When there is no flow in the conduit 99, the intermediate pressure and the low pressure at the port 77 are substantially equal. Varying the pressure in the conduit 99, varies the pressure in the chamber 47 to control the movement of the valve element 37 and thereby regulate flow of fluid therethrough.

The conduit 99 is connected in flow communication with the chamber 47 via a conduit 103. A variable needle valve 107 is situated in the conduit 103 to regulate the flow rate of fluid from the conduit 99 to the chamber 47 to control the speed of operation of the valve element 37.

With some cryogenic gases in some distribution systems, it is important to maintain their temperatures above a certain minimum to avoid damage to the conduits and other equipment. Means is provided to inhibit temperature of the gas phase from being too cold. A temperature sensor 115 is connected in flow communication to the conduit 103. The sensor 115 is also associated with the conduit 23 and is operable to sense the temperature of the gas in the conduit 23. A preferred sensor is a capillary type sensor that contains a liquid whose viscosity increases with decreasing temperature. One such sensor is available as Model 135 low temperature valve from Kaye & MacDonald. If the gas in the conduit 23 is colder than a predetermined temperature, the sensor 115 includes a valve 116 that will open and release gas thru outlet 117 thereby to reduce the pressure in conduit 103 to close the valve element 37 and thereby reduce the temperature of the gas in the conduit 23. It is to be understood that the sensor 115 may sense the temperature of the fluid in the conduit 23 directly by being in contact therewith or may sense the temperature of the fluid indirectly, e.g., by sensing the temperature of the conduit 23 which is indicative of the fluid temperature.

In order to better understand the above described apparatus, its operation is described below. When gas is needed for the equipment 15, for example, when the gas is not sufficiently available from a primary source 121, or the primary source fails, flow of liquified gas is commenced through the conduit 21 from the source 11. This can be accomplished by simply having a pressure downstream of pilot valve assembly 75 fall below a minimum pressure pre-determined by the spring force on one side of the diaphragm 85. The falling pressure in conduit 23 causes a reduction on pressure in the port 77. The spring force will overcome the gas pressure from port 77 on the diaphragm and the pilot valve element 87 will open. This results in a flow of high pressure gas from conduit 89 flowing past valve element 87 into the intermediate pressure conduit 99 thereby increasing the intermediate pressure. This increased pressure is sensed in the dome of control valve 31 via conduit 103. The increased pressure causes valve element 37 to move away from its seat and start a flow of liquid through port 39. The fluid expands and commences phase change to it gas phase. Fluid then flows through conduit 17 to vaporizer 19 where the phase change to gas is generally completed and the gas can warm if needed prior to flowing to its point of use, e.g., the equipment 15. This inflow of gas will raise the pressure in conduit 23. If the pressure downstream of the vaporizer rises too high (too much gas flow), the pressure in the pilot valve assembly 75 at the port 77 will increase and override the spring bias force and fully close the valve formed by the valve element 87 and valve seat 88. As the pressure in the conduit 99 falls because of the bleed flow thru the restriction orifice 101, the pressure in the chamber 47 will also fall allowing the valve element 37 to close more and thereby reduce fluid flow thru the valve 31. By lowering the rate at which fluid is introduced into the conduit 23, the outlet pressure therein will, as a result, fall and the flow will be in balance again. Should the pressure in the conduit 23 fall indicating reduced gas flow, the pilot valve will then open raising the pressure in the conduit 99 and hence the chamber 47 to thereby open further the valve element 37 and provide higher fluid flow to bring the system in balance again.

Should the temperature become too low, as described above, the gas in conduits 99, 103 and the chamber 47 will vent thru the outlet 117 and thereby override the operation of the pilot valve 75 to close the valve 31 more or completely until the temperature increases enough to close the valve in the sensor 115 at which point normal operation can commence again. The energy required to operate the controller 71 and valve 31 is derived from the fluid preferably the gas phase of the fluid as described above.

When introducing elements of the present invention or the preferred embodiment(s) thereof, the articles “a”, “an”, “the” and “said” are intended to mean that there are one or more of the elements. The terms “comprising”, “including” and “having” are intended to be inclusive and mean that there may be additional elements other than the listed elements.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A system for delivering fluid from a source of liquified gas, said system comprising:

a source storing fluid as liquified gas;

a conduit connected in fluid flow communication with the source and operable for discharge of fluid from said source;

a fluid flow control valve connected in fluid communication in said conduit fluid flow-wise downstream of the source and separating said conduit into an infeed conduit portion in which the fluid is in a liquid phase and an outfeed conduit portion comprising a liquid-to-gas vapor conversion means downstream of the fluid flow control valve in which the fluid changes at least partially to a gas phase with the outfeed conduit portion being fluid flow-wise downstream of the infeed conduit portion, said fluid flow control valve being operable to receive fluid in liquid phase and regulate the flow of fluid in liquid phase from the source to the outlet conduit portion; and a controller in fluid communication with the flow control valve and operable solely thru fluid communication between the controller and the flow control valve to control the flow of fluid from the source in liquid phase at least partially thru the flow control valve and to the outfeed conduit portion in response to flow of fluid in its gas phase in the liquid-to-gas vapor conversion means of the outfeed conduit portion, said controller being substantially completely powered with energy from the fluid in its gas phase wherein the controller includes a pressure sensor operable to sense the pressure of the fluid in the outfeed conduit and wherein the controller includes a pilot valve in fluid communication with the flow control valve and the pressure sensor and operable solely thru fluid communication in response to pressure in the outfeed conduit to control the amount the fluid flow control valve is open and thereby regulate the flow rate of fluid therethrough within a predetermined range.

2. A system as set forth in claim 1 wherein said pressure sensor includes a diaphragm, said diaphragm being operably connected to a valve element in said pilot valve and operable to move said valve element between open and closed positions to thereby control flow of fluid through the pilot valve to the flow control valve.

3. A system as set forth in claim 2 wherein fluid from the infeed conduit is supplied to the flow control valve through the pilot valve to control the amount the flow control valve is open and thereby regulate the flow rate of fluid therethrough.

4. A system as set forth in claim 1 wherein said controller includes a temperature sensor operable to sense temperature of fluid in the outfeed conduit and operably connected to said flow control valve and at least partially close the flow control valve if the temperature of the fluid in the outfeed conduit is at or below a predetermined temperature.

5. A system as set forth in claim 1 wherein the energy used by the controller derives entirely from the fluid in the outfeed conduit.

* * * * *